Oct. 18, 1932. W. L. McGRATH ET AL 1,883,389
ENGINE STARTER
Filed April 24, 1931

INVENTOR
William L. McGrath
BY Clinton S. James
ATTORNEY

Patented Oct. 18, 1932

1,883,389

UNITED STATES PATENT OFFICE

WILLIAM L. McGRATH, OF ELMIRA, NEW YORK, ASSIGNOR TO ECLIPSE MACHINE COMPANY, OF ELMIRA, NEW YORK, A CORPORATION OF NEW YORK

ENGINE STARTER

Application filed April 24, 1931. Serial No. 532,478.

This invention relates to starting mechanism for internal combustion engines, and more particularly to an automatic shift for starting pinions embodying inter-threaded springs for shifting and driving the pinion, in which novel and improved means are provided for anchoring and supporting the springs.

It is an object of the present invention to provide an automatic shift of the above type in which the springs are anchored to the pinion and to its actuating member by means of interlocking connections whereby the device is simple and economical to build and the parts are held securely in assembled position.

Another object of the invention is to provide such a device in which the anchorages for the springs are so formed as to distribute the driving strains so as to reduce liability of distortion or breakage of the springs.

Figure 1:
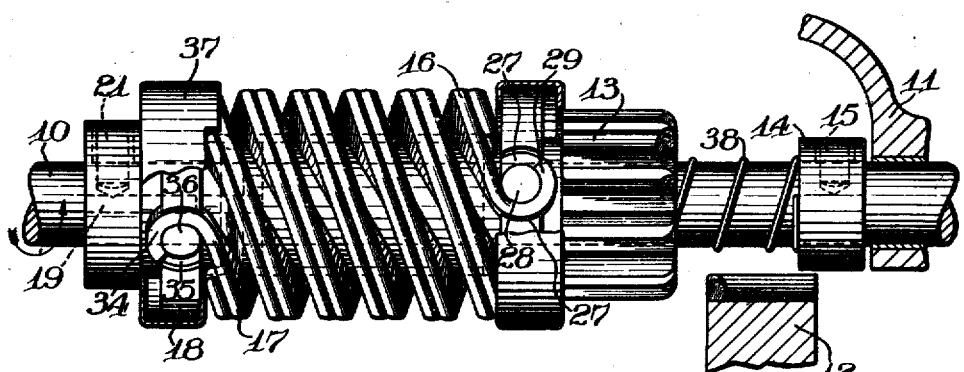
Figure 2:
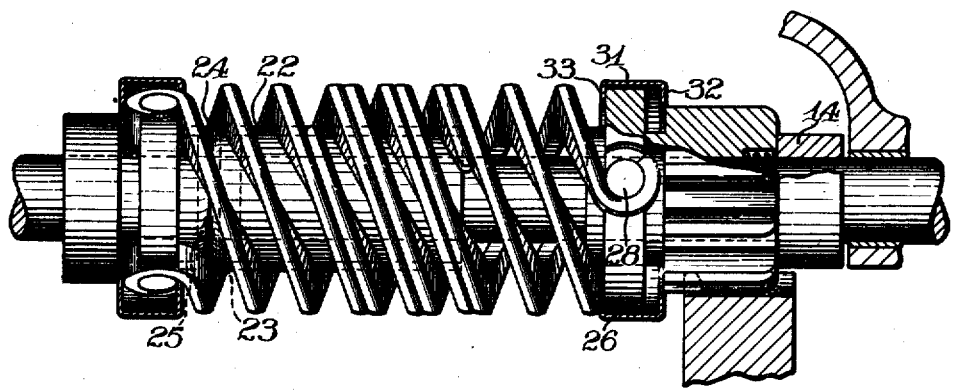

Further objects and advantages will be apparent to those skilled in this art from the following description taken in connection with the accompanying drawing in which:

Fig. 1 is a side elevation of a preferred embodiment of the invention partly broken away showing the parts in normal or idle position; and Fig. 2 is a similar view showing the parts in their driving position.

In Fig. 1 of the drawing there is illustrated a support and power member in the form of a shaft 10 which may be the extended armature shaft of a starting motor not shown. The outer end of said shaft is suitably positioned as by means of a bearing 11 adjacent a member of an engine to be started, a portion of which member is illustrated in the form of a flywheel gear 12.

A driving member for said flywheel gear in the form of a pinion 13 is freely mounted on the shaft 10 in position to be moved thereon into and out of driving engagement with the engine member, its engaging position being determined by an abutment in the form of a collar 14 suitably fixed to the shaft 10 as by means of a set screw 15.

The pinion 13 is adapted to be actuated into and out of engagement with the flywheel member by means of interthreaded spiral spring members 16 and 17 anchored respectively to the pinion 13 and an actuating member 18 which is suitably fixed to the shaft 10 as by means of a key 19 and set screw 21. The spring members 16 and 17 are preferably formed rectangular in cross section with the larger dimension arranged radially in order to provide large areas of frictional contact between the engaging springs and to render said springs stiffer with respect to torsion than with respect to compression. A spacing and supporting element in the form of a sleeve 22 is mounted on an extended portion 23 of the anchoring member 18, being suitably retained thereon as by means of depressions 24 which are forced into a registering channel 25 in said anchoring member. Said sleeve serves to support and maintain coaxial the spring members 16 and 17 and to determine the idle position of the pinion 13 as illustrated in Fig. 1.

The springs 16 are anchored to the pinion 13 according to the present invention by means of interlocking connections formed integrally in said parts. For this purpose pinion 13 is provided near one end with a radially extending flange 26 having a diameter equal to the diameter of the spiral springs, and anchoring studs 28 are formed in said flange. These studs are preferably formed by means of a hollow mill arranged to cut arcuate channels 27 in the periphery of flange 26 having a width slightly greater than the thickness of the springs 16. The diameter of the studs 28 defined thereby is preferably substantially equal to the thickness of the flange 26.

The springs 16 are formed at their anchoring ends with eye portions 29 formed to fit loosely within the channels 27 and surround or partly surround the studs 28, the depth of the channels 27 being so arranged that the eyes of the springs are substantially flush with the surface of said flange. In order to retain the springs 16 in assembled position on the flange 26, a thimble 31 is arranged to surround the flange, covering said channels and having inturned lips 32 and 33 which prevent longitudinal motion of the thimble.

The spiral springs 17 are provided with eyes 34 arranged to seat in channels 35 in the actuating member 18, surrounding studs 36 thereon, and retained in place by a thimble 37, all as above described in connection with the anchorages of the springs 16.

In assembling this device, springs 16 are first mounted on the pinion 13, the thimble 27 is then slid over the flange 26 and retained in place by bending inward the flanges 32 and 33. In practice it is usual to form the flange 32 on the thimble 31 prior to assembly thereof and then during the assembly operation it is only necessary to bend in the flange 33 to lock the parts in assembled position.

The springs 17 are then mounted in a similar manner on the anchoring member 18, and are retained in place by the thimble 37. The spacing sleeve 22 is then inserted within the springs 17 and retained on the extension 23 of the anchoring member 18 by forcing inward the depressions 24 as above described. The two spring assemblies are then inter-threaded with each other and slid upon the shaft 10, and the anchoring member 18 retained thereon by the key 19 and set screw 21.

An anti-drift spring 38 may be provided as illustrated between the stop member 14 and the pinion 13 in order to normally retain the pinion in its idle position.

In operation of the device, rotation of the shaft 10 from the starting motor in the direction of the arrow in Fig. 1 causes rotation of the actuating member 18 and its spring assembly whereby the pinion assembly by reason of its inertia is caused to thread itself longitudinally to the right along the shaft 10 until the pinion 13 comes into driving engagement with the flywheel member 12. When longitudinal motion of the pinion is arrested by the stop 14 as illustrated in Fig. 2, further rotation of the shaft 10 causes the pinion to be rotated through the yielding frictional driving connection formed by the inter-threaded springs 16 and 17, whereby cranking of the engine takes place.

When the engine starts, the over-running of the pinion 13 due to the acceleration of the flywheel 12 causes the spring members 16 to be threaded back into the spring members 17, thus withdrawing the pinion 13 to its idle position, as shown in Fig. 1.

It will be seen that due to the inter-locking connection between the ends of the springs and the pinion and actuating member respectively, the springs are securely retained on the said members, and since a certain amount of pivotal motion of the ends of the springs on the studs 28 is permitted by this form of anchorage, the driving stresses on the springs are not localized and danger of deformation or breakage thereof is obviated.

Although but one embodiment of the invention has been shown and described in detail, it will be understood that various changes may be made in the dimensions and relationships of the parts without departing from the spirit of the invention as defined by the claims appended thereto.

What is claimed is:

1. In an automatic shift for starter gearing, a driving member having a circumferential flange provided with an arcuate recess in its periphery, a spiral spring for actuating said driving member having an annular terminal portion adapted to engage in said recess, and means surrounding said flange and recess to retain the end of said spring therein.

2. In an automatic pinion shift for starter gearing, a driving member having a circumferential flange provided with an arcuate recess in its periphery forming an anchoring stud therein, a spiral spring for actuating said driving member having an annular terminal portion adapted to seat in said recess and embrace said stud, and a thimble arranged to surround said flange and stud and retain the end of said spring therein.

3. In an automatic pinion shift for starting gearing, a power shaft, a driving member adapted to be loosely mounted thereon for movement into and out of engagement with a member of an engine to be started, said driving member having a circumferential flange provided with an arcuate recess in its periphery spaced from said shaft, a spiral spring for actuating said driving member, arranged to surround said shaft and having an annular terminal portion adapted to engage in said recess, and a sleeve mounted coaxially of said shaft and arranged to maintain said spring coaxial with said shaft.

4. In an automatic pinion shift for starter gearing, a power shaft, a driving member adapted to be loosely mounted thereon for movement into and out of engagement with a member of an engine to be started, an actuating member fixed to said shaft, a plurality of inter-threaded spiral springs surrounding said shaft anchored to the actuating member and driving member respectively and so arranged that acceleration of the actuating member causes the springs to push the driving member into engagement with a member of an engine to be started, and acceleration of the driving member causes the springs to draw the driving member out of engagement with the engine member, and a sleeve mounted coaxially with said shaft between the actuating and driving members for maintaining said springs coaxial and to form an abutment for the driving member when it is moved out of engagement with the engine member.

5. In an automatic pinion shift for engine starters, a pinion having a circumferential flange, the periphery of said flange being recessed arcuately to form an anchoring stud, and an operating member for said pinion having a terminal portion adapted to enter said recess laterally and embrace said stud.

6. In an automatic pinion shift for engine starters, a pinion having a circumferential flange, the periphery of said flange being recessed arcuately to form a radial stud tangential to a side of said flange, and an obliquely arranged operating member for said pinion having a terminal portion adapted to enter said recess laterally and embrace said stud.

In testimony whereof I have signed this specification.

WILLIAM L. McGRATH.

CERTIFICATE OF CORRECTION.

Patent No. 1,883,389.            October 18, 1932.

WILLIAM L. McGRATH.

It is hereby certified that error appears in the above numbered patent requiring correction as follows: In the heading to the drawing, name of patentee for "W. L. McGrath Et al" read "W. L. McGrath"; and that the said Letters Patent should be read with this correction therein that the same may conform to the record of the case in the Patent Office.

Signed and sealed this 7th day of February, A. D. 1933.

(Seal)

M. J. Moore,
Acting Commissioner of Patents.

having a terminal portion adapted to enter said recess laterally and embrace said stud.

6. In an automatic pinion shift for engine starters, a pinion having a circumferential flange, the periphery of said flange being recessed arcuately to form a radial stud tangential to a side of said flange, and an obliquely arranged operating member for said pinion having a terminal portion adapted to enter said recess laterally and embrace said stud.

In testimony whereof I have signed this specification.

WILLIAM L. McGRATH.

CERTIFICATE OF CORRECTION.

Patent No. 1,883,389.           October 18, 1932.

WILLIAM L. McGRATH.

It is hereby certified that error appears in the above numbered patent requiring correction as follows: In the heading to the drawing, name of patentee for "W. L. McGrath Et al" read "W. L. McGrath"; and that the said Letters Patent should be read with this correction therein that the same may conform to the record of the case in the Patent Office.

Signed and sealed this 7th day of February, A. D. 1933.

(Seal)

M. J. Moore,
Acting Commissioner of Patents.

CERTIFICATE OF CORRECTION.

Patent No. 1,883,389.  October 18, 1932.

WILLIAM L. McGRATH.

It is hereby certified that error appears in the above numbered patent requiring correction as follows: In the heading to the drawing, name of patentee for "W. L. McGrath Et al" read "W. L. McGrath"; and that the said Letters Patent should be read with this correction therein that the same may conform to the record of the case in the Patent Office.

Signed and sealed this 7th day of February, A. D. 1933.

(Seal)

M. J. Moore,
Acting Commissioner of Patents.